United States Patent
Grundmann

(10) Patent No.: US 7,503,434 B2
(45) Date of Patent: Mar. 17, 2009

(54) INPUTTING OR ADJUSTING REFERENCE POSITIONS IN A DOOR CONTROLLER

(75) Inventor: Steffen Grundmann, Bonstetten (CH)

(73) Assignee: Inventio AG, Hergiswil NW (CH)

( * ) Notice: Subject to any disclaimer, the term of this patent is extended or adjusted under 35 U.S.C. 154(b) by 538 days.

(21) Appl. No.: 11/221,502

(22) Filed: Sep. 8, 2005

(65) Prior Publication Data

US 2006/0070821 A1    Apr. 6, 2006

(30) Foreign Application Priority Data

Oct. 1, 2004    (EP) ................................ 04405615

(51) Int. Cl.
*B66B 13/14*    (2006.01)

(52) U.S. Cl. ...................... 187/316; 187/317

(58) Field of Classification Search ................. 187/316, 187/317; 318/257, 264, 260, 265
See application file for complete search history.

(56) References Cited

U.S. PATENT DOCUMENTS

| | | | | |
|---|---|---|---|---|
| 4,342,379 A | * | 8/1982 | Games et al. ............... | 187/316 |
| 4,498,033 A | * | 2/1985 | Aihara et al. ............... | 318/261 |
| 4,832,158 A | * | 5/1989 | Farrar et al. ................ | 187/316 |
| 5,274,312 A | * | 12/1993 | Gerstenkorn ............... | 318/617 |
| 5,378,861 A | * | 1/1995 | Barten et al. ............... | 187/316 |
| 5,625,175 A | * | 4/1997 | Gutknecht et al. .......... | 187/316 |
| 5,864,104 A | * | 1/1999 | Tawada et al. .............. | 187/316 |
| 5,880,417 A | * | 3/1999 | Koh .......................... | 187/394 |

FOREIGN PATENT DOCUMENTS

| | | |
|---|---|---|
| CN | 1280096 | 1/2001 |
| DE | 911777 | 12/1955 |
| DE | 42 06 272 | 9/1993 |
| EP | 0 665 182 | 8/1995 |
| EP | 0837025 | 4/1998 |
| EP | 0 849 210 | 6/1998 |
| JP | 11209043 | 8/1999 |
| JP | 2000016730 | 1/2000 |
| JP | 2000272853 | 10/2000 |
| JP | 2005170652 A * | 6/2005 |
| WO | WO 9943593 | 9/1999 |

\* cited by examiner

*Primary Examiner*—Walter Benson
*Assistant Examiner*—Eduardo Colon-Santana
(74) *Attorney, Agent, or Firm*—Fraser Clemens Martin & Miller LLC; William J. Clemens

(57) ABSTRACT

A door controller and a method for inputting or adjusting one or more reference positions into the door controller have the controller connected to a door drive for moving a door and utilize a pulse encoder for monitoring a position of the door and a non-volatile memory for storing the reference position. In a learning mode a control force signal to the drive is reduced. Then the door is moved to the reference position and finally the reference position as recorded by the pulse encoder is registered in the memory of the controller.

10 Claims, 2 Drawing Sheets

INPUTTING OR ADJUSTING REFERENCE POSITIONS IN A DOOR CONTROLLER

BACKGROUND OF THE INVENTION

The present invention relates to a door controller and a method for inputting or adjusting one or more reference positions used by the door controller and, in particular, to a method for quickly teaching the controller accurate reference positions along a door travel path.

Modern elevator door controllers use travel curves to dictate the movement of a door along a track between its closed and open positions. Such travel curves define the desired door speed as a function of the door position or of the time. A pulse encoder is frequently used to provide the controller with a signal indicating the door position. Such a system is described in European published application EP-A1-0665182. In an initial learning run, the controller implements a door opening operation during which the door is moved by a drive along a track from the closed position to a fully open position where further movement of the door in the opening direction is prevented by a mechanical stopper or alternatively by an open-limit switch mounted on the track. Whereas the stopper physically restricts motion of the door along the track, the open-limit switch, when activated, signals the controller to stop the drive and thereby also restricts motion of the door along the track. During this learning run the total distance from the closed position to the fully open position is registered by the pulse encoder into a memory accessible by the controller. Accordingly, the total travel path for the door is known to the controller. Intermediate switches may be mounted along the track to signal-changes in the desired travel curve to the controller (for example there may be an intermediate switch to indicate the position where the motion of the door should change from a constant creeping speed to full acceleration). Alternatively, the controller can automatically calculate these intermediate reference positions using the total travel distance and register these into the memory as discussed in Japanese patent document JP-A-2000016730.

After initial installation, it is important to make adjustments to the reference positions so as to compensate for mechanical tolerances and most importantly to ensure that the edge of the fully open door is flush with the door jamb. Adjustment may also be required during modernization or maintenance of the elevator installation.

Conventionally, any adjustment of the reference positions is performed by manually accessing the door track and shifting the respective switches or stoppers along the track until they are in the correct positions and then instructing the controller to repeat the learning run. This is a laborious and time-consuming task, particularly in an elevator installation where it may have to be repeated for each individual landing of the installation. Furthermore, the task can be very frustrating if only minor adjustment is required.

SUMMARY OF THE INVENTION

Accordingly, an objective of the present invention is to ease the task of adjusting the reference positions used in a controller for automatic doors and in particular to reduce the time and labor required to make the necessary adjustments. The fully open or any other reference position can be registered into the door controller without requiring the door to interact with any device such as a stopper or switch mounted along the door guidance track. Hence, to reconfigure the controller it is no longer necessary to gain access to the track and move the stoppers or switches to a new position.

This objective is achieved by the method and the controller according to the present invention. The door is freely movable to any intermediate position along the door track meaning that the door is not physically obstructed (i.e. by a stopper) nor does the door interact with any means signaling the controller to restrict further motion (i.e. a limit switch), nor does the door interact with any means signaling the controller to restrict motion to a specified pattern (i.e. an intermediate switch). In other words, the door is freely movable between the mechanical ends of the door and the reference position may be registered at any position along the track. Indeed, the limit switches, intermediate switches or stoppers of the prior art are superfluous to the present invention since the reference positions are registered independently of any physical restriction in, or interaction along, the door track. To input or adjust a reference position, the controller is switched to a learning mode and the door is merely moved to the required position which is an unrestricted position along the track and that position as recorded by the position monitoring means is registered as a reference position. Hence, to configure or reconfigure the controller there is no longer a requirement to access the door track and manually move any stoppers or switches.

Preferably, the controller can automatically register the reference position in memory. As the door is moved to and held stationary at the desired position, the controller verifies that there is no change in the position as recorded by the position monitoring means for a specific period of time and automatically registers this position into memory as the reference position. Hence, no additional equipment is required for the engineer to register the reference position in the memory. Since the door must be held in the desired position for a specific time period, it is beneficial that the door is moved by hand rather than by the door drive, otherwise the door drive would tend to continue to move the door at the desired position and the engineer would have to counteract the force developed by the drive in order to keep the door stationary. The door drive could be completely de-energized to facilitate manual movement. More beneficially, the control force signal to the driver could be set at a value sufficient only to overcome any biasing force acting on the door. This would make it very easy for the engineer to manually move the door to the desired position.

Alternatively, an input device may be provided for the engineer to directly trigger the registration of the reference position into the memory of the controller. In this case, the door can be moved manually as described above or alternatively the controller could be used to automatically move the door at a slow speed such that when the door reaches the desired position, the engineer manually activates the input device. In the latter case the engineer does no need to move the door at all.

The present invention is particularly advantageous when applied to the door controller of an elevator installation since by its very nature an elevator has multiple landings each of which may require the individual input or adjustment of several reference positions. To access the door track for each landing is time consuming and labor intensive. With the present invention, the engineer need only move the door to the desired reference positions and register these in the memory without having to access the door track.

The easiest reference position to register using the method and controller of the present invention is the fully open position of the door. No measurement or judgment is required from the engineer as all he has to do is move the door until the edge of the door lies flush with the neighboring door frame and then register this position in the memory as the fully open position.

Furthermore, since the same position monitoring means is used both during normal operation of the controller and to actually register the reference positions in the learning mode there is inherently less likelihood of error.

DESCRIPTION OF THE DRAWINGS

The above advantages of the present invention, as well as other advantages, will become readily apparent to those skilled in the art from the following detailed description of a preferred embodiment when considered in the light of the accompanying drawings in which.

DESCRIPTION OF THE PREFERRED EMBODIMENT

Figure 1:
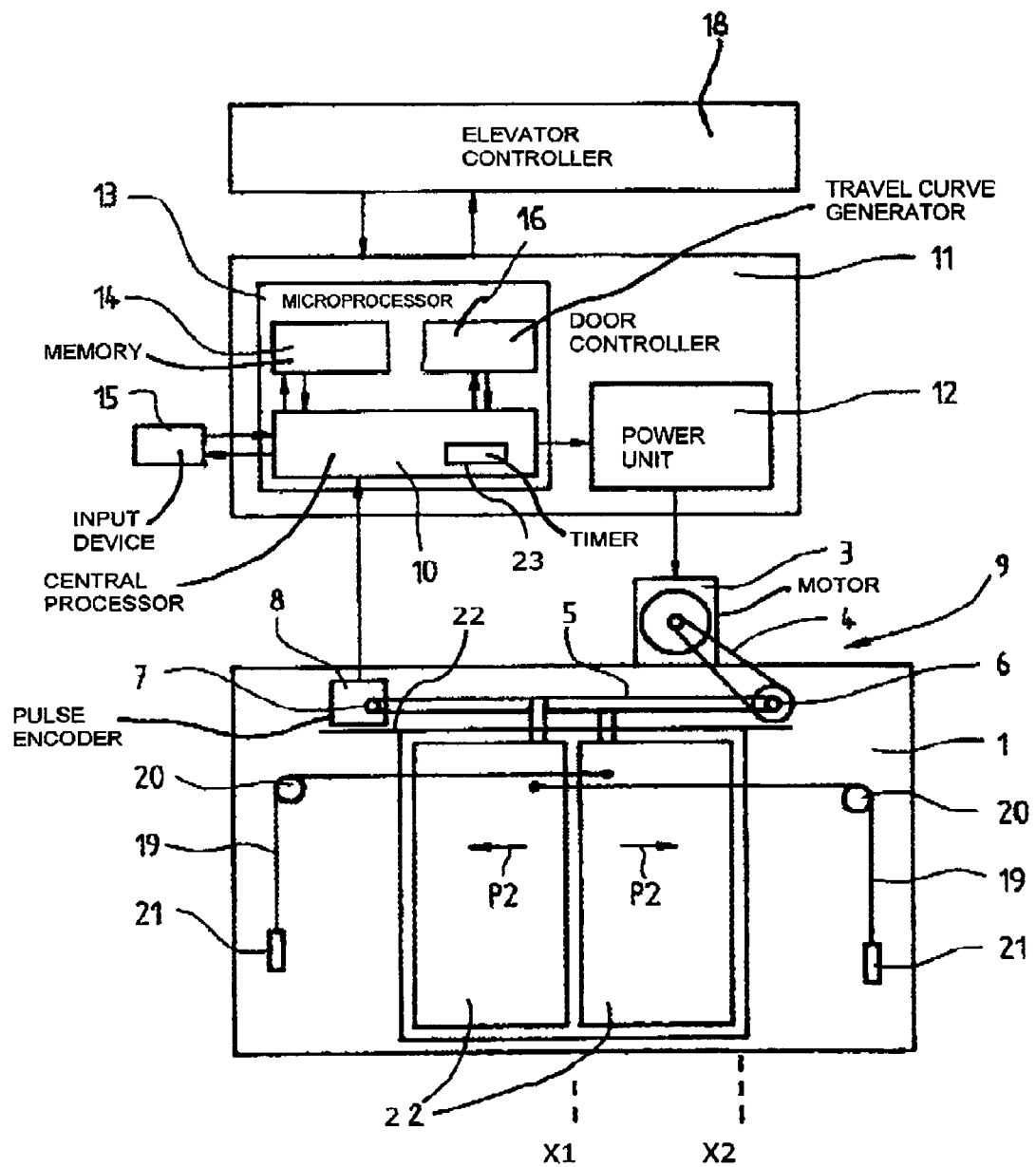
FIG. 1 is a schematic diagram of an elevator door controller in accordance with a preferred embodiment of the present invention.

A door controller 11 according to the present invention is illustrated in FIG. 1. An elevator car 1 has a pair of door panels 2 which are driven along a track 22 by a door drive 9. The drive 9 has an electrical motor 3 driving a first toothed belt 4 which rotates a drive roller 6. The drive roller 6 drives a second toothed belt 5 which rotates a first deflecting roller 7 attached to a pulse encoder 8. The door panels 2 are connected to and move simultaneously with the second toothed belt 5. A pair of arrows P2 indicates the opening direction of movement of the door panels 2 from a central closed position X1 to the respective fully opened positions X2. The motor 3 is supplied with electrical energy from a power unit 12 within the controller 11. Each door panel 2 is connected to a closing weight 21 by a cable pull 19 which extends around a second deflecting roller 20. The closing weight 21 biases the panel 2 to the central closed position Xl.

The movement of the door panels 2 is controlled by a microcomputer 13 within the controller 11. The microcomputer 13 contains a central processor 10 communicating with a non-volatile memory register 14, a travel curve generator 16 and externally with the power unit 12. The pulse encoder 8 has an output connected to the central processor 10 to provide a signal representing the distance traveled by the door panels 2. Algorithms implemented in the travel curve generator 16 utilize the signal from the pulse encoder 8 to generate target values to control the operation of the door drive 9 via the power unit 12. The power unit 12 outputs a control force signal to the drive 9. This control force signal is dependent upon the position of the door panels 2 and represents the force to be applied by the drive 9 at any given moment in time to produce the desired door motion.

An elevator controller 18, connected to and superordinate to the door controller 11, initiates the opening movement of the door panels 2 and dispatches the elevator car 1 when the door is closed.

As a safety margin, the track 22 from which the car door panels 2 are suspended and guided is always manufactured to have a length sufficient to permit the door panels 2 to open wider than actually required on-site. Accordingly, on installation of the elevator it is always necessary to adjust the factory preset opening width to that actually required X2. Furthermore, different floors of the building may have different door frames defining different opening widths, in which case the fully open position X2 of the car door panels 2 would vary between floors.

Figure 2:
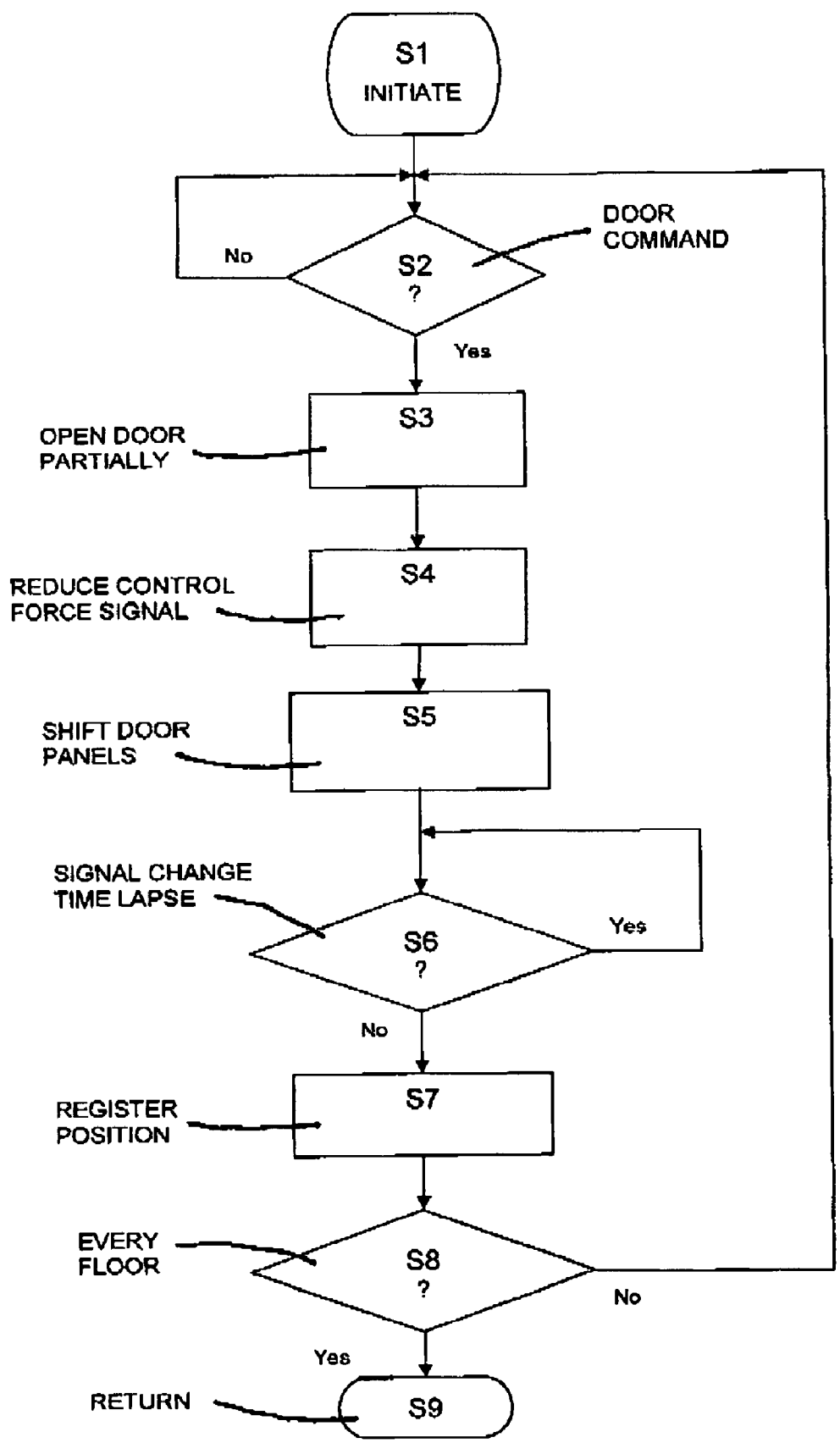
FIG. 2 is a flow diagram of a routine performed by the door controller of FIG. 1 in accordance with a preferred embodiment of the present invention.

FIG. 2 shows the structure and sequence of a method routine according to the present invention to adjust the fully open position X2 for a given floor. This learning mode is initiated at a first step S1 by the engineer using an input device 15 (FIG. 1) connected to the microcomputer 13. The routine loops from a "No" branch at a decision step S2 until the next door open command is generated. On occurrence of the next open command, when the car 1 reaches a requested landing, the routine exits the second step S2 at a "Yes" branch. Then the controller 11 opens the door partially, e.g. to 90% of the factory preset opening width in a step S3. Then the controller 11 reduces the control force signal output to the door drive 9 for all positions of the door panels 2 in a fourth step S4. This may be accomplished by de-energizing the door drive 9. The engineer, in a fifth step S5, is then able to easily shift the door panels 2 manually against the bias of the weights 21 until the panel edges are flush with the door frame of the given landing. In a decision sixth step S6, a timer or clock 23 within the controller 11 loops at a "No" branch while the door is moving. The step S6 branches at "Yes" when it recognizes the fact that the position signal from the encoder 8 has not changed for a specific period of time for example three seconds (indicating that the door panels 2 are stationary) and triggers the controller 11 to register this positional value in the non-volatile memory register 14 as the fully open position X2 for that specific floor in a seventh step S7. The travel curve generator 16, using this new information, can then compute and store the most effective travel curve to control the operation of the door drive 9 for that particular floor. In a decision eighth step S8 the engineer can put in a car call for another floor and branch at "No" to repeat this procedure until the accurate, fully open positions X2 have been registered in the controller 11 for every floor of the installation. Alternatively, the engineer can terminate the learning routine using the input device 15 to branch at "Yes" and the door controller 11 returns to normal operation in a step S9.

Instead of completely de-energizing the door drive 9 in the fourth step S4, the control force signal from the power unit 12 could be reduced to a constant value so that the force applied by door drive 9 is sufficient only to counteract the closing force of the biasing weights 21. This arrangement would allow the engineer to manually move the door panels 2 more easily as there is no effective biasing force acting on the panels 2.

The sixth step S6 establishes that the door panels 2 are in the correct reference position to be registered in the memory 14. Instead of waiting until there is no change in the positional signal from the encoder 8 as described above, the controller 11 may require an interaction from the engineer using the input device 15. Indeed, if the input device 15 is used to record the reference position X2 in the memory 14, then in the steps S4 and S5, the control force signal could be set to a reduced level which automatically opens the door panels 2 at a slow speed and when the door panels 2 reach the reference position X2, the engineer can simply trigger the input device 15 to record the position X2 into the memory.

Although described specifically for the learning of the fully open position X2, it will be readily appreciated that the routine according to the present invention can be used for registering any reference position used by the travel curve generator 16. For example, the reference position could be the position along the travel path at which the drive 9, having initially moved the door panels 2 at a constant creep speed from the fully closed position, is instructed by the controller 11 to apply maximum acceleration. The controller and the method could also be used to define the subsequent position from which the speed of the door panels 2 should be held constant and/or the position at which deceleration must be commenced to ensure that the door panels 2 decelerate smoothly to the fully open position X2.

The input device 15 could be a button (or a series of buttons if more than one reference position is to be registered in the memory 14), but preferably the input device 15 is a keypad. This is particularly advantageous if more than one reference position is to be registered for each floor as the engineer can initiate the routine on a single input device for each reference position rather than pressing individual buttons.

Although the present invention has been specifically described with reference to elevator doors, it will be appreciated that it is equally applicable to any type of powered sliding doors, whether they are center opening or side opening. The doors may be biased to the fully closed position by any suitable means such as the closing weight 21 or a spring, or they may rely solely on the drive 9 to provide all intended motion.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for inputting one or more reference positions into a door controller having position monitoring means for continually monitoring a position of the door along a door track and a memory for storing the reference position comprising:
   a. switching the door controller to a learning mode;
   b. moving the door to an intermediate, unrestricted position along the door track; and
   c. registering the intermediate, unrestricted position as recorded by the position monitoring means into the memory as the reference.

2. The method according to claim 1 wherein said step c. is performed when the controller determines that there has been no change in the position of the door as recorded by the position monitoring means for a predetermined period of time.

3. The method according to claim 1 wherein the controller outputs a control force signal to a door drive to control the motion of the door and prior to said step b. either the controller de-energizes the drive, or the controller reduces the control force signal to a value sufficient to counteract any biasing force acting on the door.

4. The method according to claim 1 wherein said step c. is performed by manual activation of an input device to trigger the registration of the reference position.

5. The method according to claim 1 wherein the controller outputs a control force signal to a door drive to control the motion of the door and prior to said step b. the controller sets the control force signal to a reduced level to automatically open the door at a slow speed.

6. The method according to claim 1 wherein the door controller operates the doors of an elevator installation, said steps b. and c. are carried out consecutively for each landing of the elevator installation and the reference position is stored in the memory for each landing.

7. The method according to claim 6 wherein the reference position is a fully open position at which an edge of the door lies flush with a door frame of the corresponding elevator landing.

8. A door controller for controlling movement of a door along a door track comprising:
   monitoring means for continually monitoring a position of the door along the door track and generating a signal representing the monitored position;
   a memory connected to said monitoring means for storing at least one reference position of the door in response to said monitoring means signal;
   an input device for selectively switching the door controller from a normal operating mode to a learning mode; and
   means for triggering storing in said memory an intermediate, unrestricted position along the door track as monitored by said monitoring means as said at least one reference position during said learning mode.

9. The door controller according to claim 8 wherein said triggering means is a timer triggering said storing of said at least one reference position if the position of the door as represented by said monitoring means signal has not changed for a predetermined period of time.

10. The door controller according to claim 8 wherein said input device is manually operable as said triggering means causing said at least one reference position to be stored in said memory.

* * * * *